United States Patent
Kobilka et al.

(10) Patent No.: US 10,954,376 B2
(45) Date of Patent: Mar. 23, 2021

(54) ORGANOPHOSPHORUS FLAME-RETARDANT TETRAZINES

(71) Applicant: International Business Machines Corporation, Armonk, NY (US)

(72) Inventors: Brandon M. Kobilka, Tucson, AZ (US); Jason T. Wertz, Pleasant Valley, NY (US); Scott B. King, Rochester, MN (US); Jacob Porter, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 16/298,300

(22) Filed: Mar. 11, 2019

(65) Prior Publication Data

US 2020/0291222 A1    Sep. 17, 2020

(51) Int. Cl.

| | |
|---|---|
| *C08L 47/00* | (2006.01) |
| *C08L 23/14* | (2006.01) |
| *C08K 5/3477* | (2006.01) |
| *C08K 5/5333* | (2006.01) |
| *C08K 5/5313* | (2006.01) |
| *C08K 3/32* | (2006.01) |

(52) U.S. Cl.
CPC ............. *C08L 47/00* (2013.01); *C08K 3/32* (2013.01); *C08K 5/3477* (2013.01); *C08K 5/5313* (2013.01); *C08K 5/5333* (2013.01); *C08L 23/142* (2013.01); *C08L 2201/02* (2013.01)

(58) Field of Classification Search
CPC .... C08L 47/00; C08L 23/142; C08L 2201/02; C08K 3/32; C08K 5/3477; C08K 5/5313; C08K 5/5333
USPC ........................................................ 524/100
See application file for complete search history.

(56) References Cited

U.S. PATENT DOCUMENTS

| | | |
|---|---|---|
| 2013/0084415 A1 | 4/2013 | McGrady et al. |
| 2018/0230282 A1* | 8/2018 | Loy .......................... C08C 19/38 |

FOREIGN PATENT DOCUMENTS

| | | |
|---|---|---|
| WO | 2017057758 A1 | 4/2017 |
| WO | 2017173128 A1 | 10/2017 |

OTHER PUBLICATIONS

Wang et al., "3,6-Substituted-1,2,4,5-tetrazines: tuning reaction rates for staged labeling applications," Organic & Biomolecular Chemistry, 2014, 12, pp. 3950-3955, The Royal Society of Chemistry.

Prokhorov et al., "Triazines, Tetrazines, and Fused Ring Polyaza Systems," Chapter 5.3, Progress in Heterocyclic Chemistry, vol. 25, 2013, pp. 391-408, Elsevier.

Mo et al., "Bioaccumulation of polybrominated diphenyl ethers, decabromodiphenyl ethane, and 1,2-bis(2,4,6-tribromophenoxy) ethane flame retardants in kingfishers (*Alcedo atthis*) from an electronic waste-recycling site in South China," Environmental Toxicology and Chemistry, vol. 31, No. 9, pp. 2153-2158, 2012, SETAC.

Bagge et al., "Transforming Polybutadiene with Tetrazine Click Chemistry into Antioxidant Foams That Fluoresce with Oxidation," Chemistry of Materials, 2017, 29, pp. 7953-7960, American Chemical Society. DOI: 10.1021/acs.chemmater.7b02973.

Sci Finder Results, Tetrazine Background, printed Aug. 9, 2018, 14 pages.

* cited by examiner

*Primary Examiner* — Hui H Chin
(74) *Attorney, Agent, or Firm* — Kelsey M. Skodje

(57) ABSTRACT

A flame-retardant compound, a process for forming a flame-retardant compound, and an article of manufacture are disclosed. The flame-retardant compound includes a tetrazine moiety and at least one organophosphorus moiety. The process includes obtaining starting materials, which include a benzonitrile compound, a phosphorus-based compound, and hydrazine. The process also includes reacting the starting materials to form a tetrazine flame retardant. The article of manufacture includes a polymer and a flame-retardant compound having a tetrazine moiety and at least one organophosphorus moiety.

10 Claims, 9 Drawing Sheets ly related to flame-retardant polymers and, more specifically, organophosphorus flame retardants.

ORGANOPHOSPHORUS FLAME-RETARDANT TETRAZINES

BACKGROUND

The present disclosure relates to flame-retardant polymers and, more specifically, organophosphorus flame retardants.

Flame retardants in polymers can be broadly classified as additive or reactive. Additive flame retardants are blended with the polymer, while reactive flame retardants are covalently bound to the polymer chain. Additive flame retardants are mixed into polymers during blending, curing, foaming, extrusion, or other processing techniques. Reactive flame retardants are bound at sites along the polymer chain, incorporated into the chain as comonomers, and/or used as cross-linkers.

SUMMARY

Various embodiments are directed to a flame-retardant compound. The flame-retardant compound includes a tetrazine moiety and at least one organophosphorus moiety. The at least one organophosphorus moiety can be a substituent derived from 9,10-dihydro-9-oxa-10-phosphaphenanthrene-10-oxide (DOPO). The flame-retardant compound can be a compound having R and R' reactive functional groups. In some embodiments, R and R' are alkyl substituents.

Additional embodiments are directed to a process, which includes obtaining starting materials and reacting the starting materials to form a tetrazine flame retardant. The starting materials include a phosphorus-based compound, a benzonitrile compound, and hydrazine. The benzonitrile compound can be 4-hydroxybenzonitrile, 4-(hydroxymethyl)benzonitrile, 4-(chloromethyl)benzonitrile, or 4-(acetoxymethyl)benzonitrile. The phosphorus-based compound can be 9,10-dihydro-9-oxa-10-phosphaphenanthrene-10-oxide (DOPO), 5,5-dimethyl-[1,3,2]dioxaphosphinane-2-oxide (DDPO), phosphoryl chloride ($POCl_3$), a phosphate ester, a phosphonate ester, or a phosphinate ester. The starting materials can also include a phenol. The process can also include reacting the tetrazine flame retardant with a polymer having alkene moieties in an inverse electron demand Diels-Alder reaction. This polymer can be a polybutadiene or poly(ethylene-co-propylene-co-5-methylene-2-norbornene). Further, the process can include blending the tetrazine flame retardant into a polymer. In some embodiments, the tetrazine flame retardant includes reactive functional groups, which allow the tetrazine flame retardant to form crosslinking bonds in a polymer matrix.

Further embodiments are directed to an article of manufacture. The article of manufacture includes a polymer and a flame-retardant compound. The flame-retardant compound includes a tetrazine moiety and at least one organophosphorus moiety. In some embodiments, the polymer is a synthetic rubber or a polybutadiene. The flame-retardant compound can be bound to the polymer. The article of manufacture can also include an electronic component.

DETAILED DESCRIPTION

Figure 1:
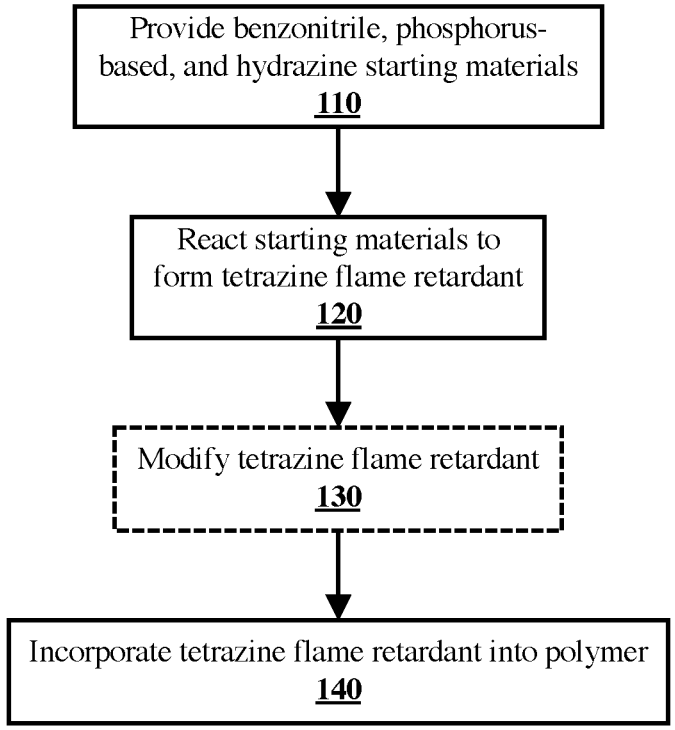
FIG. 1 is a flow diagram illustrating a process of forming a flame-retardant polymer, according to some embodiments of the present disclosure.

Flame retardants are added to a wide variety of materials in order to ensure safety and protect the materials from damage. Examples of materials that often include flame-retardant additives include plastics, paints, coatings, foams, adhesives, synthetic fibers, insulation, and synthetic rubbers. Many of these materials are incorporated into electronics hardware (e.g., printed circuit boards (PCBs), integrated circuit packages, semiconductors, transistors, optoelectronics, capacitors, resistors, chip carriers, housings, etc.). For example, resins for PCBs can be made flame retardant by incorporating polymers (e.g., epoxy resins, polyhydroxyurethane, polycarbonate, polyester, polyacrylate, polyimide, polyamide, polyurea, and/or poly(vinyl-ester) polymers) combined with flame retardants. In other examples, flame retardants are blended into synthetic fibers used in items such as clothing, acoustic dampening materials, cushioning, furniture, insulation, curtains, and carpets.

Flame retardants commonly used in the aforementioned applications include organophosphorus compounds and organobromine compounds, which are also referred to as "brominated flame retardants (BFRs)." Organophosphorus flame retardants and BFRs can be additive or reactive, depending upon the reactivity of functional groups present on the molecules. That is, reactive flame retardants include functional groups capable of forming covalent bonds at one or more sites in a polymer matrix, being incorporated into the chain as comonomers, and/or being used as cross-linkers.

Additive flame retardants are blended into polymers without binding. Therefore, additive flame retardants leach out of materials more easily than reactive flame retardants. This can lead to bio-accumulation of the flame retardant and a reduction in flame retardancy over time. It has been necessary to reduce or eliminate the use of many BFRs and other halogenated compounds due to their potential for bioaccumulation, environmental persistence, and toxicity. For example, the European Chemical Agency (ECHA) has issued guidelines limiting the use of some BFRs to less than 0.1%. Therefore, new organophosphorus flame retardants are needed to replace BFRs in polymer applications.

According to the present disclosure, polymers containing organophosphorus flame retardants having tetrazine moieties are formed. These flame retardants are referred to herein as "tetrazine flame retardants." Tetrazines are reactive cyclic structures that include a six-membered aromatic ring having four nitrogen and two carbon atoms. Tetrazines are used in click chemistry applications, as conjugation tags for materials chemistry, and in bioorthogonal chemistry. Tetrazines can also be used in high-energy materials and coordinating ligands. Substituted tetrazines are generally used in these applications, as the unsubstituted tetrazines are too unstable to be practical.

There are three families of tetrazines: 1,2,3,4-tetrazines, 1,2,3,5-tetrazines, and 1,2,4,5-tetrazines. Of these families, 1,2,4,5-tetrazines are the most commonly used. For example, 3,6-disubstituted 1,2,4,5-tetrazines react readily with alkenes. Tetrazine moieties in 3,6-disubstituted 1,2,4, 5-tetrazines have the following structure:

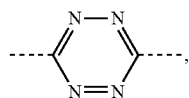

where the dotted lines represent binding locations of the substituents.

The tetrazine flame retardants are 3,6-disubstituted 1,2,4, 5-tetrazines with organophosphorus ligands bound to the tetrazine moieties. The tetrazine flame retardants are incorporated into polymers containing carbon-carbon double bonds (alkenes) as reactive flame-retardants. The tetrazine moieties react with the alkenes to form covalent bonds (e.g., via inverse electron demand Diels-Alder reactions). In some embodiments, the organophosphorus ligands on the tetrazine flame retardants have reactive functional groups that can act as crosslinkers or be modified in additional reactions.

FIG. 1 is a flow diagram illustrating a process 100 of forming a flame-retardant polymer, according to some embodiments of the present disclosure. Starting materials for a reaction to form a flame-retardant tetrazine compound are provided. This is illustrated at step 110. The starting materials include hydrazine ($NH_2NH_2$), a benzonitrile compound (e.g., 4-hydroxybenzonitrile, 4-(hydroxymethyl)benzonitrile, 4-(chloromethyl)benzonitrile, 4-(acetoxymethyl) benzonitrile, etc.), and a phosphorus-based compound (e.g., a phosphate ester, a phosphonate ester, a phosphinate ester, phosphorus oxychloride ($POCl_3$), 9,10-dihydro-9-oxa-10-phosphaphenanthrene-10-oxide (DOPO), 5,5-dimethyl-[1,3, 2]dioxaphosphinane-2-oxide (DDPO), etc.). Hydrazine is provided as a hydrazine hydrate ($NH_2NH_2 \cdot H_2O$) solution (e.g., an aqueous solution of approximately 64%, 78-82%, or 24-26% hydrazine). The starting materials can be obtained from commercial sources, research institutions, or synthesized in situ.

In some embodiments, a starting material can include both organophosphorus and benzonitrile functionalities. For example, a phosphate ester compound having a benzonitrile moiety can be formed from $POCl_3$, a benzonitrile, and a phenol. The phenol is an unsubstituted phenol in some embodiments. However, substituted phenols can also be used. Herein, the substituted phenols are illustrated as para-disubstituted. However, meta- or ortho-disubstituted, as well as tri- or tetra-substituted phenols can be used in some embodiments. As used herein, the term "substituted" indicates that a hydrogen atom has been replaced with a carbon atom, a heteroatom, or a heteroatom-containing group. For example, a "substituted hydrocarbyl" is a radical made of carbon and hydrogen where at least one hydrogen is replaced by a carbon atom, a heteroatom (e.g., nitrogen, oxygen, or sulfur), or a heteroatom-containing group. Examples of phenol substituents that can be bound to the phenols are provided below. These substituents can also be bound to organophosphorus compounds (e.g., the phosphate esters illustrated in FIG. 2B).

The substituents can include alkyl groups. Herein, "alkyl group" refers to $C_1$-$C_{100}$ radicals, which can be linear, branched, or cyclic. When cyclic, the alkyl groups can be aromatic or non-aromatic. Examples of alkyl groups that may be used include methyl, ethyl, n-propyl, iso-propyl, n-butyl, iso-butyl, sec-butyl, tert-butyl, pentyl, iso-amyl, hexyl, octyl, cyclopropyl, cyclobutyl, cyclopentyl, cyclohexyl, cyclooctyl, and their substituted analogues. Examples of cyclic aromatic alkyls (referred to herein as "aryl groups") that may be used include $C_4$-$C_{60}$ aromatic rings, $C_4$-$C_{20}$ aromatic rings, six-carbon aromatic rings, and substituted variants thereof (e.g. phenyl, 2-methyl-phenyl, xylyl, tolyl, etc.). Substituents can also be heteroaryl groups, which are aryl groups having at least one ring carbon atom replaced by a heteroatom. Herein, the term "aromatic" also refers to pseudoaromatic heterocycles which are heterocyclic substituents that have similar properties and structures (nearly planar) to aromatic heterocyclic ligands, but are not by definition aromatic.

In some embodiments, the substituents can include alkoxy groups (e.g., methoxy, ethoxy, n-propoxy, iso-propoxy, n-butoxy, iso-butoxy, sec-butoxy, tert-butoxy, phenoxy, etc.) and their substituted analogues. An alkoxy group is a radical with an oxygen atom bonded to an organic group (e.g., an alkyl or aryl group). Alkenyl groups and their substituted analogues can also be substituents. An alkenyl group is a straight-chain, branched-chain, or cyclic hydrocarbon radical having one or more double bonds. Examples of suitable alkenyls include ethenyl, propenyl, allyl, 1,4-butadienyl, cyclopropenyl, cyclobutenyl, cyclopentenyl, cyclohexenyl, cyclooctenyl, including their substituted analogues. Substituents can also be alkynes, which are straight-chain, branched-chain, or cyclic hydrocarbon radicals having one or more triple bonds.

Substituents that provide additional functionality (e.g., crosslinking within a polymer matrix, undergoing additional polymerization, or reacting to form modified substituents) can also be included. These groups are referred to herein as "reactive functional groups." Examples of reactive functional groups can include aldehydes, allyls, halogens, epoxies, esters, ethers, ketones, carboxylates, hydroxyl, vinyl, propylene carbonate, imines, imides, amines, amides, thiols, thioethers, etc. In some embodiments, a substituent includes more than one reactive functional group (e.g., a hydroxyl-terminated ketone).

Figure 2A:
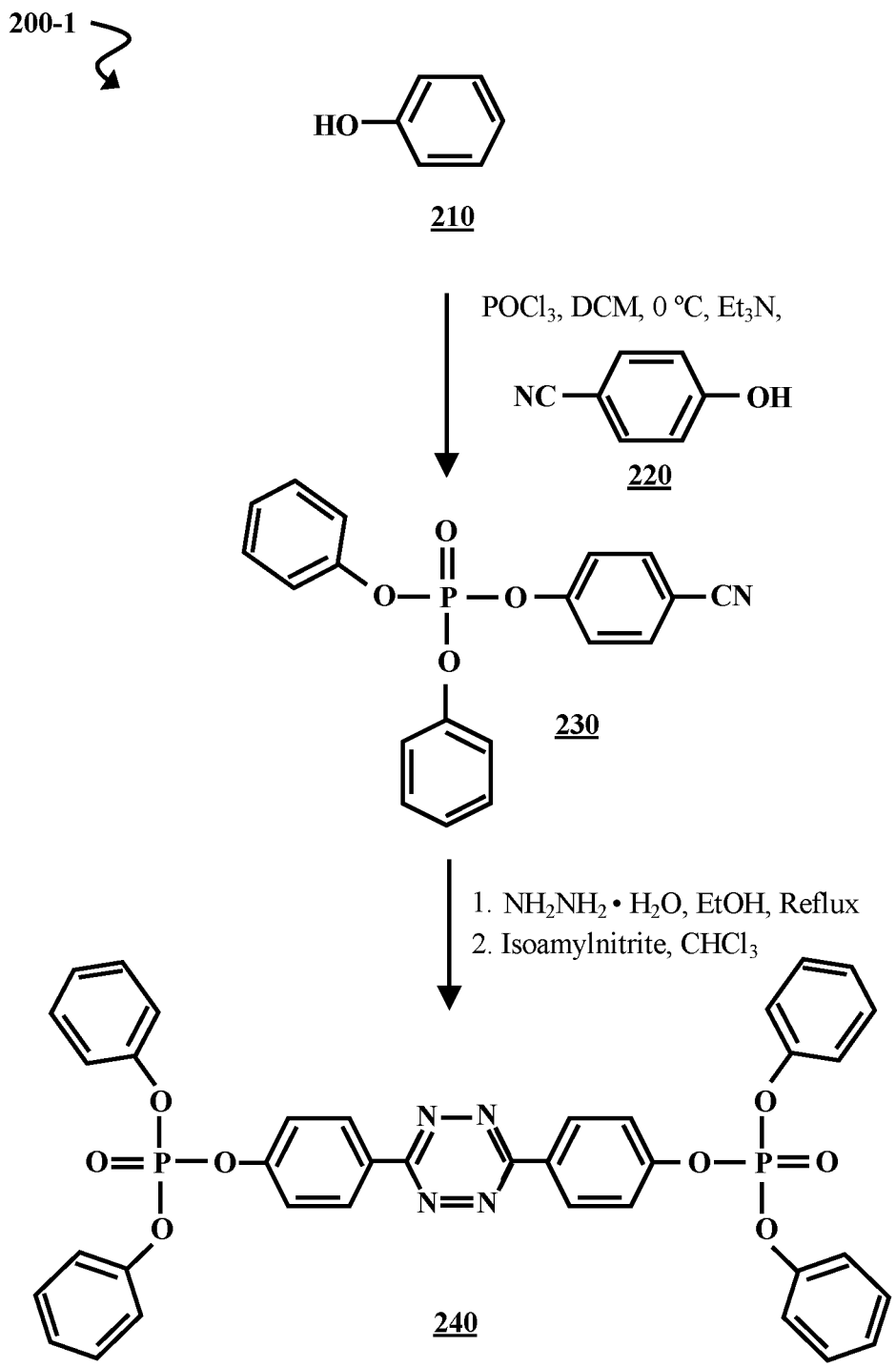
FIG. 2A is a chemical reaction diagram illustrating a process of forming a tetrazine flame retardant from a nitrile-functionalized phosphate ester, according to some embodiments of the present disclosure.
Figure 2B:
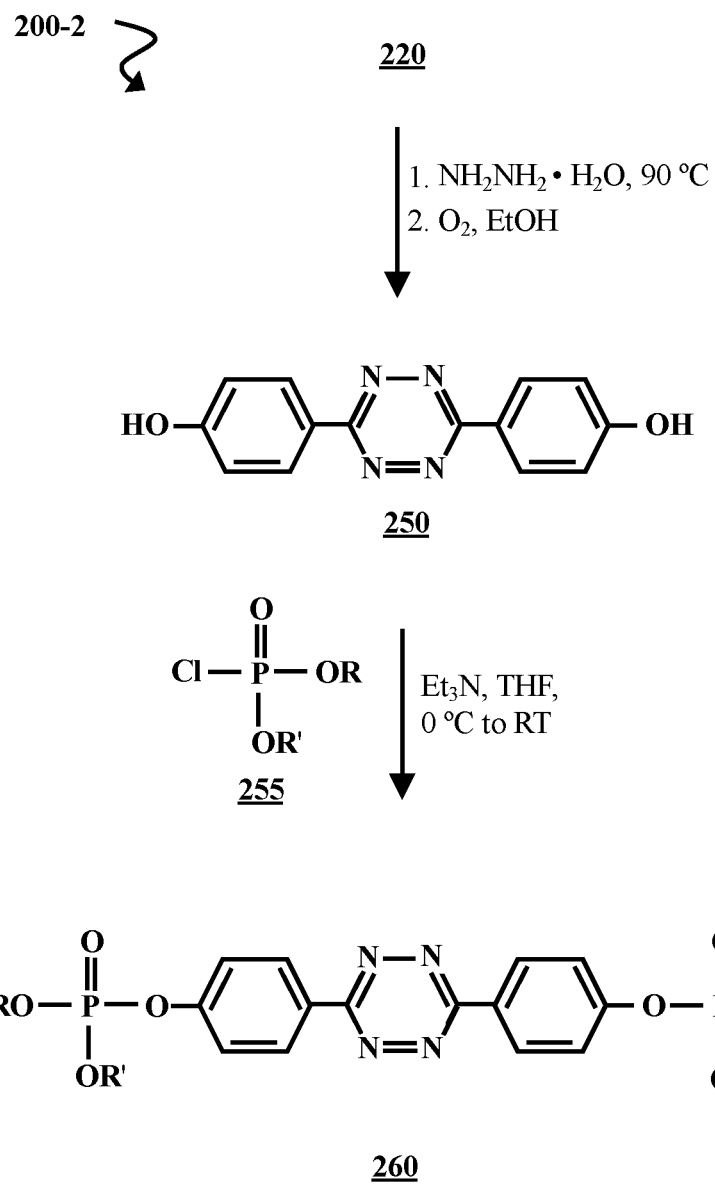
FIG. 2B is a chemical reaction diagram illustrating a first process of forming a tetrazine flame retardant from bis-phenol tetrazine, according to some embodiments of the present disclosure.

The starting compounds are reacted to form a tetrazine flame retardant. This is illustrated at step 120. Various routes to forming tetrazine flame retardants can be used, which can involve the formation of different intermediates. However, each technique involves a reaction between hydrazine and two equivalents of a compound having a nitrile (—CN)

moiety. This reaction forms a tetrazine moiety and nitrogen (N$_2$) gas, which is released from the solution. Examples of reactions to form tetrazine moieties are illustrated in FIGS. 2A, 2B, and 2D. Each route to forming the tetrazine flame retardants also involves a reaction with a phosphorus-based compound. This provides the tetrazine compound with organophosphorus ligands, which impart flame retardancy. Examples of reactions that provide organophosphorus ligands are illustrated in FIGS. 2A-2C and 2E. In some embodiments, a tetrazine flame retardant can have more than one type of organophosphorus ligand. For example, the reaction stoichiometry can be controlled to provide ligands having different substituents and/or different organophosphorus esters (e.g., one phosphate and one phosphonate).

Additional reactions can be carried out to modify substituents on the tetrazine flame retardants. This is illustrated at step 130. These modifications are optionally selected to tune properties (e.g., reactivity, size/shape, solubility, flame retardancy, etc.) of the tetrazine flame retardants. However, step 130 is omitted from process 100 in some embodiments. In these instances, the tetrazine flame retardants formed at step 120 are used without modification.

Figure 3A:
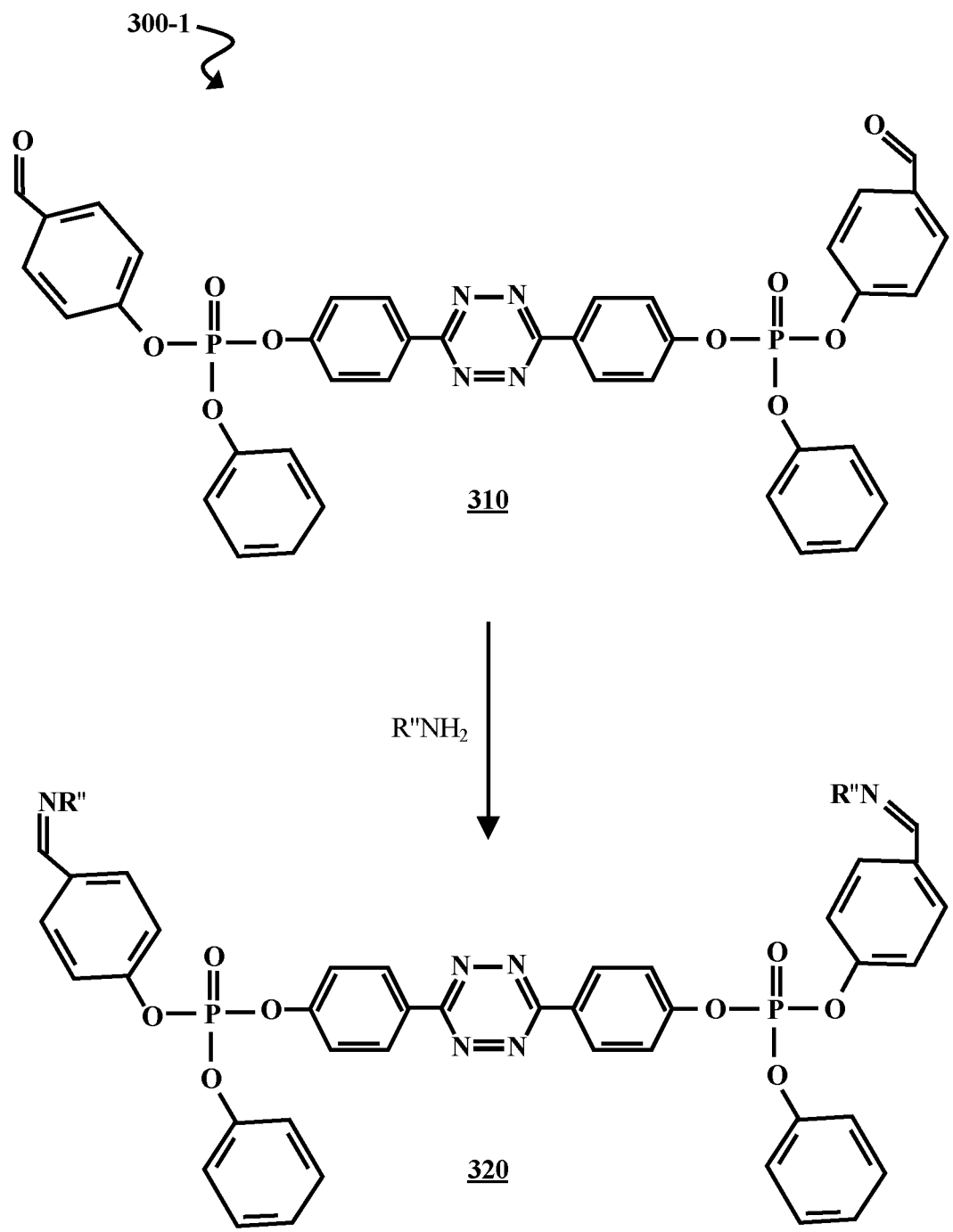
FIG. 3A is a chemical reaction diagram illustrating a process of modifying an aldehyde-functionalized tetrazine flame retardant, according to some embodiments of the present disclosure.
Figure 3B:
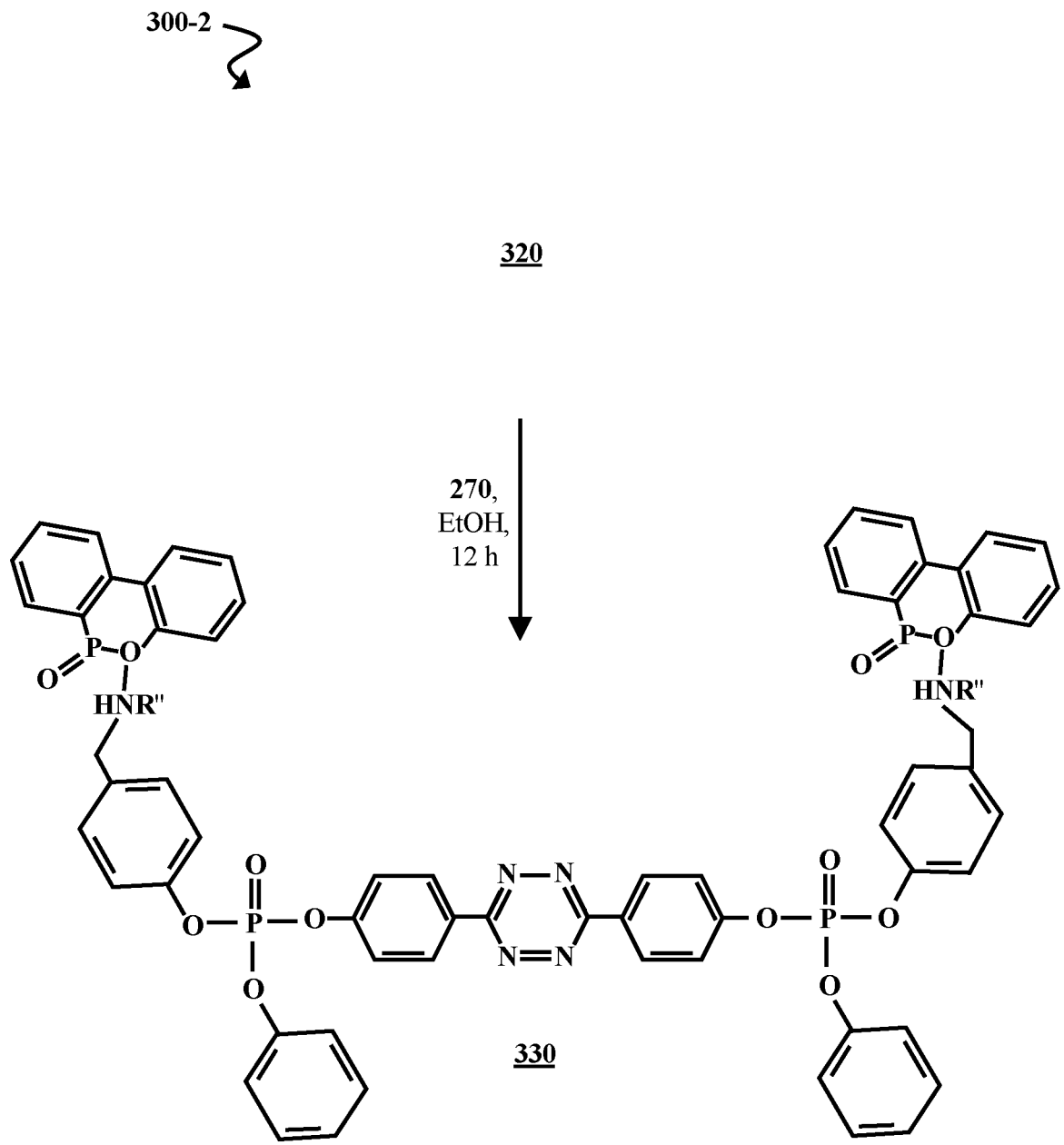
FIG. 3B is a chemical reaction diagram illustrating a process of modifying an imine-functionalized tetrazine flame retardant, according to some embodiments of the present disclosure.

When step 130 is included, a variety of modifications reactions can be carried out, depending upon the functionality of the initial tetrazine flame retardant. For example, halogen substituents can be used in transition metal cross-coupling chemistry to impart functionalities such as styrenes, aldehydes, or acetals. Epoxy groups can be converted to propylene carbonate groups by reacting the epoxies with lithium bromide (LiBr) and carbon dioxide (CO$_2$). Allyl groups can be reacted with thiols (e.g., 3-mercaptopropionate, 2-mercaptoethanol, cysteamine hydrochloride, alkyl thiols, etc.) to form thioether substituents. Aldehyde groups can be converted into functionalities that include vinyl groups, esters, and carboxylic acids using various techniques well-known in the art. Additionally, aldehyde groups can be converted to imines by reactions with amines (e.g., aryl or alkyl amines, vinyl amines, or ammonia). Additional organophosphorus ligands (e.g., derived from DOPO or DDPO) can then be added to the flame retardant by reaction with the imines. Examples of aldehyde-imine and imine-DOPO reactions are illustrated in FIGS. 3A and 3B, respectively.

The modified or unmodified tetrazine flame retardants are incorporated into polymers. This is illustrated at step 140. The incorporation results in a flame-retardant polymer. A variety of flame-retardant polymers can be formed, depending upon the selection of tetrazine flame retardants and type of polymer. The flame-retardant polymer is formed by blending a tetrazine flame retardant with a monomer solution, a bulk polymer, or a prepolymer. This mixture is then reacted at room temperature or with heat. The reaction can take place in solution, in bulk, or in an extruder. The tetrazine flame retardants can be added in any appropriate amount, such as a weight percent (wt %) of about 0.01-0.99 wt %, about 1-5 wt %, about 4-8 wt %, about 5-20 wt %, or about 10-40 wt %. The amount of tetrazine flame retardant incorporated into the polymer is selected based upon the intended flame retardancy and other properties (e.g., mechanical and/or electrical properties) of the polymer.

The polymers into which the tetrazine flame retardants are incorporated contain alkene functional groups, which react readily with tetrazines by cycloaddition (e.g., in an inverse electron demand Diels-Alder reaction). The polymers can be homopolymers, block copolymers, random copolymers, or graft copolymers. Additional reactions (e.g., crosslinking or further polymerization) can also occur between functional groups on the tetrazine flame retardants and functional groups on the polymer, prepolymer, or monomer. Classes of polymer, prepolymer, or monomer that can react with the tetrazine flame retardants can include polybutadienes (e.g., a cis-, trans-, or cis/trans-polybutadiene, a predominately vinylic polybutadiene, a polycyclohexadiene, a polychloroprene, a poly-2-phenylbutadiene, a poly-isoprene, a poly(butadiene-block-styrene), polybutadienes having terminal nucleophilic groups such as a hydroxyl, thiol, or amine, a poly(butadiene-co-acrylonitrile), a poly(acrylonitrile-butadiene-styrene), etc.), synthetic rubbers (e.g., poly(ethylene-co-propylene-co-5-methylene-2-norbornene) or ethylene propylene diene monomer (EPDM) rubber), acrylates with pendant or terminal alkenes, plant oils with unsaturated fatty acids, polyurethane prepolymer mixtures, etc.

FIG. 2A is a chemical reaction diagram illustrating a process 200-1 of forming a tetrazine flame retardant from a nitrile-functionalized phosphate ester, according to some embodiments of the present disclosure. A dichloromethane (DCM) solution containing phosphorus oxychloride (POCl$_3$) and phenol 210 is prepared. The solution is then cooled in an ice bath (e.g., to about 0° C.). Triethylamine (Et$_3$N) and 4-hydroxybenzonitrile 220 are added to the cooled reaction mixture. This results in a phosphate ester 230 having a nitrile functional group on one of its three phenyl groups. Organophosphorus esters other than the phosphate ester 230 (e.g., phosphinate esters or phosphonate esters) can be formed if POCl$_3$ is replaced by a reactant such as phenylphosphonic dichloride or diphenylphosphinic chloride. In these instances, the alternative organophosphorus ester can optionally replace the illustrated phosphate ester 230 in subsequent reaction steps.

The phosphate ester 230 is dissolved in hydrazine hydrate (NH$_2$NH$_2$.H$_2$O) alone or in a mixture of hydrazine hydrate and ethanol (EtOH). The resulting mixture is refluxed and/or heated at about 90° C. until a dihydrotetrazine intermediate (not shown) forms (e.g., approximately 10 hours (h)-20 h). In some embodiments, sulfur (S$_8$) is added to the reaction mixture. The crude dihydrotetrazine intermediate is obtained by filtration, washing with water and ethanol, and solvent evaporation. In some embodiments, the dihydrotetrazine intermediate is a yellow powder, though its physical properties can depend upon the identity of the phosphate ester 230. The dihydrotetrazine intermediate is then oxidized by isoamylnitrite in chloroform (CHCl$_3$). However, other oxidizing agents can be used. For example, oxygen can be bubbled through a solution or suspension of the dihydrotetrazine intermediate at an elevated temperature (e.g., about 50° C.) for about 3 h-10 h. The oxidation of the dihydrotetrazine intermediate produces the tetrazine flame retardant 240.

It should be noted that the phenol 210 illustrated in FIG. 2A is unsubstituted. However, the phenol 210 includes at least one substituent in some embodiments. Examples of substituents are discussed in greater detail with respect to FIG. 1. A mixture of substituted and unsubstituted phenols 210 can also be used to form the phosphate ester 230. A mixture of substituted phenols 210 having different R groups can be used as well. The resulting phosphate esters 230 and tetrazine flame retardants 240 will include the substituents of the phenol 210 starting compound.

FIG. 2B is a chemical reaction diagram illustrating a first process 200-2 of forming a tetrazine flame retardant from bis-phenol tetrazine, according to some embodiments of the present disclosure. To form the bis-phenol tetrazine 250, 4-hydroxybenzonitrile 220 is reacted with hydrazine hydrate (NH$_2$NH$_2$.H$_2$O). The 4-hydroxybenzonitrile 220 is dissolved directly in the hydrazine hydrate solution, heated to about 90° C., and allowed to react at this temperature for about 10 h-20 h. In some embodiments, sulfur ($S_8$) is added to the reaction mixture. The reaction can also take place while refluxing in an ethanol solution. The reaction between the 4-hydroxybenzonitrile 220 and hydrazine hydrate produces a bis-phenol dihydrotetrazine intermediate (not shown), which is isolated, added to ethanol, and oxidized by oxygen ($O_2$) gas. In some embodiments, the oxidation reaction is carried out at an elevated temperature (e.g., about 50° C.). Further, the oxidation reaction can be carried out using isoamylnitrite in $CHCl_3$ in other embodiments. The oxidation step produces the bis-phenol tetrazine 250.

The bis-phenol tetrazine 250 is then reacted with a chlorophosphate ester 255 having two substituents, R and R'. The substituents can be any of the substituents discussed above with respect to FIG. 1 (e.g., phenyl, alkyl, aryl, aldehyde, allyl, etc.). In some embodiments, R and R' are the same functional group, though they can also be different groups (e.g., where R is phenyl and R' is an allyl group). The bis-phenol tetrazine 250 is dissolved with the chlorophosphate ester 255 and triethylamine ($Et_3N$) in tetrahydrofuran (THF) at about 0° C. However, organophosphorus esters other than the chlorophosphate ester 255 (e.g., dichlorophosphinate esters or dichlorophosphonate esters) can be used, resulting in a flame-retardant tetrazine polymer or oligomer (not shown). Formation of flame-retardant tetrazine polymers is discussed in greater detail with respect to FIGS. 4A and 4B. In these instances, the alternative organophosphorus ester can optionally replace the illustrated phosphate ester 230 in subsequent reaction steps. The solution is then allowed to warm to room temperature. The reaction that occurs in the solution produces an R,R'-substituted tetrazine flame retardant 260. When R and R' are each phenyl groups, the resulting tetrazine flame retardant 260 is substantially the same as the tetrazine flame retardant 240 illustrated in FIG. 2A.

Figure 2C:
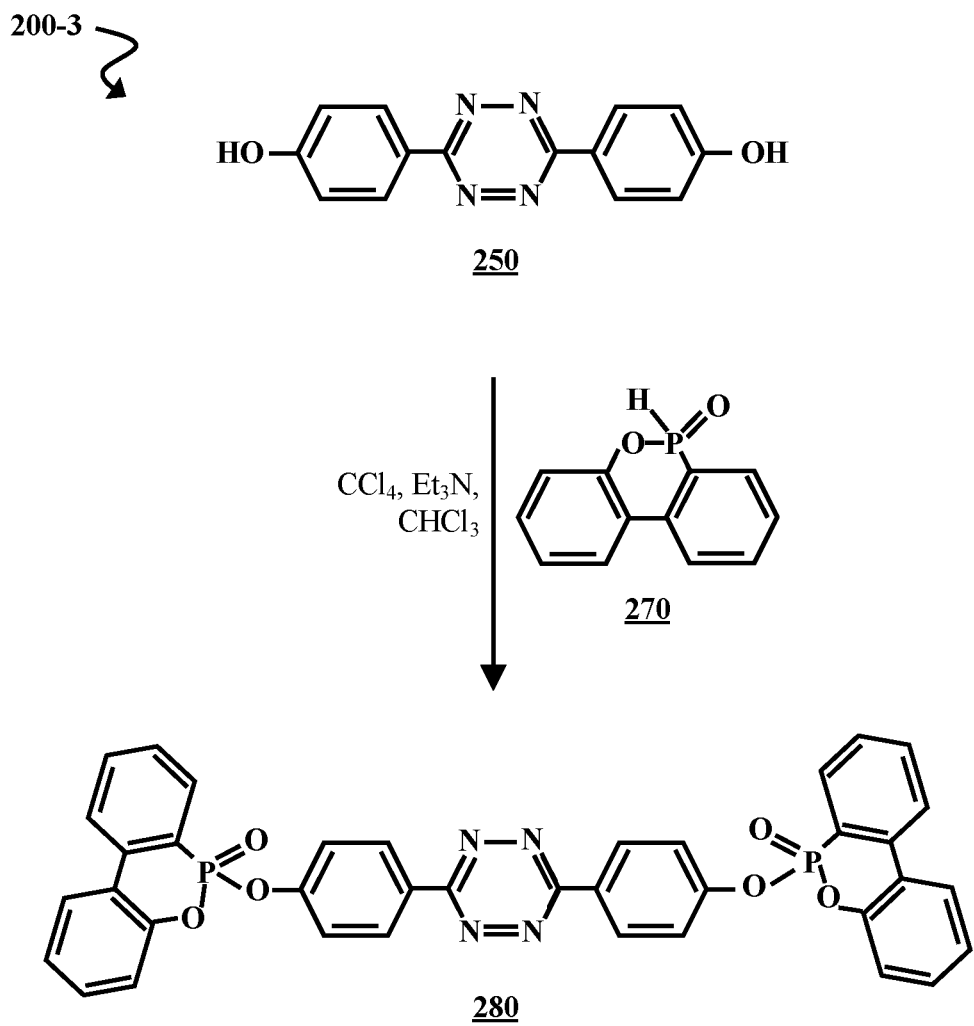
FIG. 2C is a chemical reaction diagram illustrating a second process of forming a tetrazine flame retardant from bis-phenol tetrazine, according to some embodiments of the present disclosure.
Figure 2D:
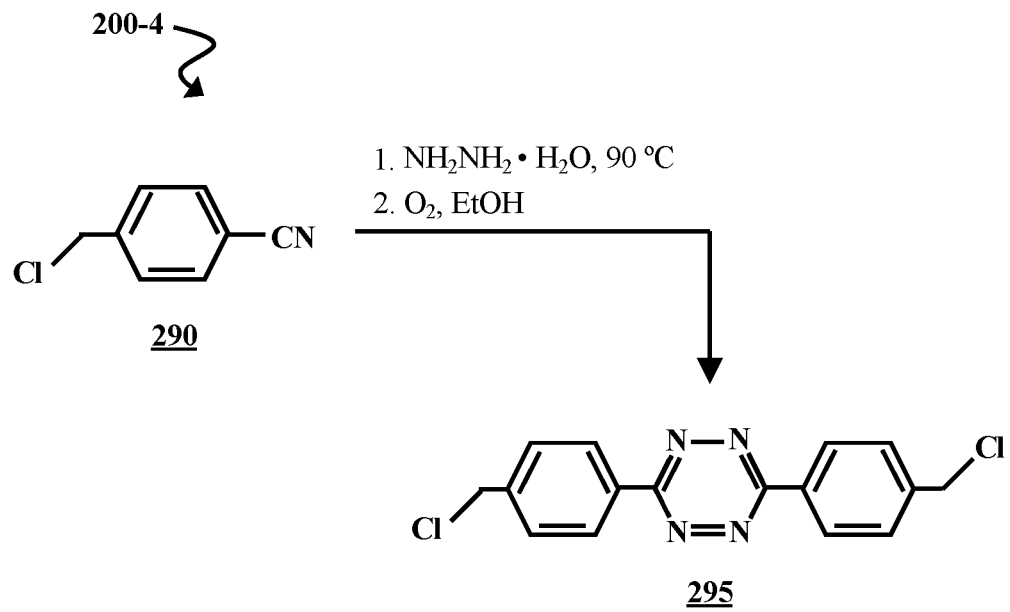
FIG. 2D is a chemical reaction diagram illustrating a process of forming a tetrazine compound from 4-(chloromethyl)benzonitrile, according to some embodiments of the present disclosure.

FIG. 2C is a chemical reaction diagram illustrating a second process 200-3 of forming a tetrazine flame retardant from bis-phenol tetrazine 250, according to some embodiments of the present disclosure. The bis-phenol tetrazine 250, carbon tetrachloride ($CCl_4$), and triethylamine ($Et_3N$) are dissolved in chloromethane ($CHCl_3$) at room temperature. However, in some embodiments a different solvent is used (e.g., dichloromethane, chloroform, dichloroethane, acetonitrile, tetrahydrofuran, 1,4-dioxane, or toluene). The solution is cooled to about 0° C. or between about 0° C. and 10° C. An organophosphorus flame retardant, 9,10-dihydro-9-oxa-10-phosphaphenanthrene-10-oxide (DOPO) 270, is then added to the solution. The solution is warmed to room temperature, and the reaction proceeds for about 12 h-18 h. The resulting tetrazine flame retardant 280 is referred to herein as a bis-DOPO(phenyl) tetrazine flame retardant 280. In some embodiments, DOPO 270 can be replaced by a similar organophosphorus flame retardant, 5,5-dimethyl-[1,3,2]dioxaphosphinane-2-oxide (DDPO). This produces an analogous bis-(DDPO)phenyl tetrazine flame retardant (not shown).

FIG. 2D is a chemical reaction diagram illustrating a process 200-4 of forming a tetrazine compound from 4-(chloromethyl)benzonitrile 290, according to some embodiments of the present disclosure. The 4-(chloromethyl)benzonitrile 290 is dissolved in a hydrazine hydrate ($NH_2NH_2 \cdot H_2O$) solution, heated to about 90° C., and allowed to react at this temperature for about 10 h-20 h. In some embodiments, sulfur ($S_8$) is added to the reaction mixture. The reaction can also take place while refluxing in an ethanol solution. The reaction between the 4-(chloromethyl)benzonitrile 290 and hydrazine produces a bis-(chloromethyl)phenyl dihydrotetrazine intermediate (not shown), which is isolated, added to ethanol, and reacted with oxygen ($O_2$) gas to form a bis-(chloromethyl)phenyl tetrazine 295. In some embodiments, this oxidation reaction is carried out at an elevated temperature (e.g., about 50° C.). Further, the oxidation reaction can be carried out using isoamylnitrite in chloroform in other embodiments.

Figure 2E:
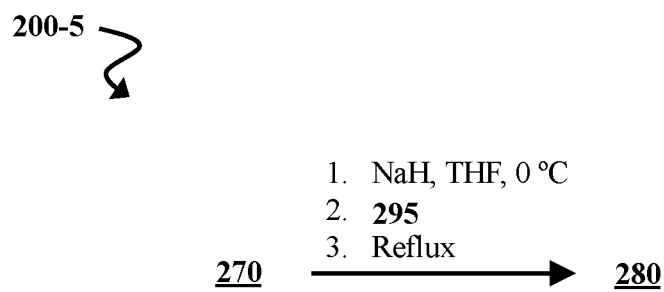
FIG. 2E is a chemical reaction diagram illustrating a process of forming a bis-DOPO(phenyl) tetrazine flame retardant from bis-(chloromethyl)phenyl tetrazine, according to some embodiments of the present disclosure.

FIG. 2E is a chemical reaction diagram illustrating a process 200-5 of forming the bis-DOPO(phenyl) tetrazine flame retardant 280 from the bis-(chloromethyl)phenyl tetrazine 295, according to some embodiments of the present disclosure. This reaction begins with a reaction between DOPO 270 and sodium hydride (NaH). A mixture of DOPO 270 and NaH in tetrahydrofuran (THF) is prepared, and then cooled to about 0° C. The bis-(chloromethyl)phenyl tetrazine 295 is added to the cooled reaction mixture, which is then heated to reflux. The reaction produces the bis-DOPO (phenyl) tetrazine flame retardant 280 illustrated in FIG. 2C.

FIG. 3A is a chemical reaction diagram illustrating a process 300-1 of modifying an aldehyde-functionalized tetrazine flame retardant 310, according to some embodiments of the present disclosure. The aldehyde-functionalized tetrazine flame retardant 310 can be produced by any appropriate techniques. For example, substantially the same techniques as those illustrated in FIGS. 2A and 2B can be used. When the techniques illustrated in FIG. 2A are employed, the starting material for the reaction to form the aldehyde-functionalized tetrazine flame retardant 310 includes one equivalent of aldehyde-substituted phenol starting material and one equivalent of the unsubstituted phenol 210. When the techniques illustrated in FIG. 2B are employed, a chlorophosphate ester 255 where R is an aldehyde-functionalized phenyl and R' is an unsubstituted phenyl is used.

The aldehyde-functionalized tetrazine flame retardant 310 is reacted with an amine ($R''NH_2$), where R" is an alkyl or aryl substituent. Examples of alkyl and aryl substituents are discussed in greater detail with respect to FIG. 1. However, in some embodiments R" is a hydrogen atom or a vinyl group. The amine reacts with aldehyde functional groups on the aldehyde-functionalized tetrazine flame retardant 310, producing an imine-functionalized tetrazine flame retardant 320.

FIG. 3B is a chemical reaction diagram illustrating a process 300-2 of modifying the imine-functionalized tetrazine flame retardant 320, according to some embodiments of the present disclosure. The imine-functionalized tetrazine flame retardant 320 is combined with DOPO 270 in an ethanol (EtOH) solution. The reaction proceeds for about 12 h or longer to form a tetrazine flame retardant 330 having additional organophosphorus groups and, therefore, enhanced flame retardancy. Additional functionality can be added to this tetrazine flame retardant 330 by selecting an amine with a reactive R" functional group in process 300-1.

Figure 4A:
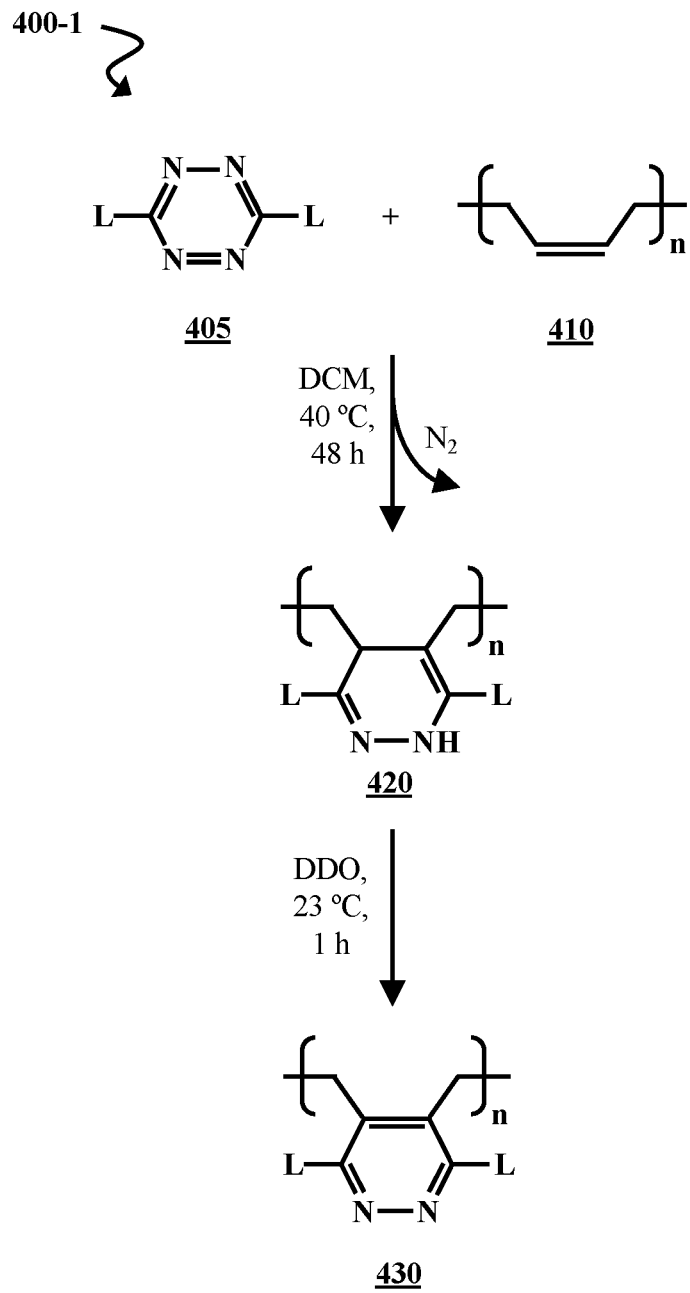
FIG. 4A is chemical reaction diagram illustrating a process of incorporating a tetrazine flame retardant into a polybutadiene, according to some embodiments of the present disclosure.

FIG. 4A is chemical reaction diagram illustrating a process 400-1 of incorporating a tetrazine flame retardant into polybutadiene, according to some embodiments of the present disclosure. The tetrazine flame retardant is represented by a generic tetrazine flame retardant 405 having a tetrazine moiety and two L groups, which represent organophosphorus ligands. The generic tetrazine flame retardant 405 is also referred to as "tetrazine flame retardant 405," and can represent any of the tetrazine flame retardants disclosed herein, such as the tetrazine flame retardants 240, 260, 280, 310, 320, and 330 illustrated in FIGS. 2A-2C, 2E, 3A, and 3B. Additional examples of tetrazine flame retardants that can be represented by the generic tetrazine flame retardant 405 are discussed in greater detail with respect to FIG. 1.

In process 400-1, the tetrazine flame retardant 405 is reacted with polybutadiene 410 in an inverse electron demand Diels-Alder (or, "Carboni-Lindsey") reaction. However, other polymers having alkene moieties can be used instead of polybutadiene 410. Examples of these polymers are discussed in greater detail with respect to FIG. 1. The polybutadiene 410 can have any appropriate number (n) of repeat units. For example, n can be an integer between 1 and 1,000,000 (e.g., about 1-25,000, about 500-25,000, about 1,000-25,000, about 2,000-25,000, about 5,000-25,000, about 25,000-50,000, about 50,000-500,000, etc.). In some embodiments, the polybutadiene 410 has a number average molecular weight ($M_N$) between about 2,000 g/mol and 25,000 g/mol (e.g., about 4400 g/mol, about 10,000 g/mol, about 22,000 g/mol, etc.), though any conventional polybutadiene 410 can be used.

The tetrazine flame retardant 405 and polybutadiene 410 are combined with dichloromethane (DCM) in an extruder or other reaction vessel. The resulting solution is degassed with argon for about 30 min, heated to about 40° C., and then refluxed for about 48 h or longer (e.g., about 72 h). The reaction produces nitrogen ($N_2$) gas, which is allowed to vent into the atmosphere. However, the $N_2$ gas can also be used to produce a foam. In these instances, the reaction is carried out at room temperature for about 12 h-72 h.

The reaction between the tetrazine flame retardant 405 and polybutadiene 410 produces a flame-retardant polybutadiene derivative 420 having a dihydropyridazine moiety. In some embodiments, this polymer 420 is used as a flame-retardant material in various applications. However, the dihydropyridazine amine group can be oxidized or reacted further with functionalities such as epoxies, isocyanates, aldehydes, etc. In process 400-1, the solution containing the dihydropyridazine polymer 420 is cooled to room temperature (e.g., about 23° C.). A solution of dimethyl dioxirane (DDO) in acetone is added to the room temperature mixture, which is then stirred for about one hour. This oxidation reaction produces a flame-retardant polybutadiene derivative 430 having a pyridazine moiety. If a tetrazine flame retardant 405 with reactive functional groups is used to form the polymer 430, these functional groups can form crosslinking bonds or participate in other reactions. Examples of these reactions are discussed in greater detail above.

Figure 4B:
FIG. 4B is a chemical reaction diagram illustrating a process of incorporating a tetrazine flame retardant into a synthetic rubber, according to some embodiments of the present disclosure.
Figure 4B:
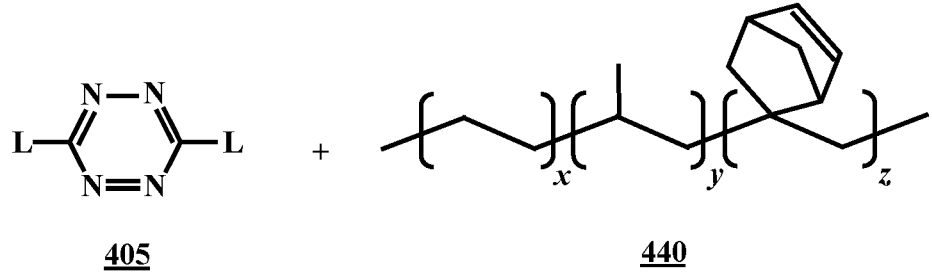
Figure 4B:
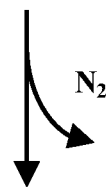
Figure 4B:
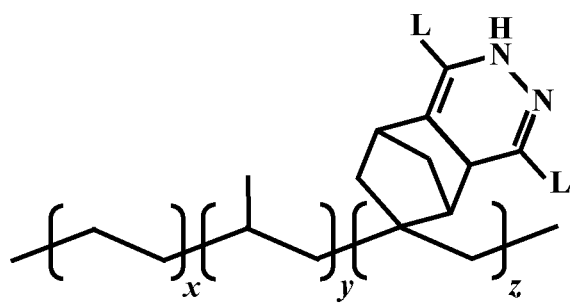

FIG. 4B is a chemical reaction diagram illustrating a process 400-2 of incorporating a tetrazine flame retardant 405 into a synthetic rubber, according to some embodiments of the present disclosure. The synthetic rubber 440 is poly(ethylene-co-propylene-co-5-methylene-2-norbornene). The numbers of the repeat units in this rubber 440 and the resulting flame-retardant polymer 450 are represented by x, y, and z in FIG. 4B. In some embodiments, the synthetic rubber 440 has an ethylene content of about 50%. However, other ethylene contents are possible (e.g., about 45%-85%).

The reaction between the tetrazine flame retardant 405 and the synthetic rubber 440 can be carried out using substantially the same techniques as those of process 400-1 (FIG. 4A). These techniques can include the reaction conditions of both the illustrated reaction and the production of a foam in a room temperature reaction between the tetrazine flame retardant 405 and the synthetic rubber 440. However, both processes 400-1 and 400-2 can be adjusted according to polymerization techniques known to those of skill in the art. Process 400-1 results in a flame-retardant rubber 450. If a tetrazine flame retardant 405 with reactive functional groups is used to form the flame-retardant rubber 450, the functional groups can form crosslinking bonds or participate in other reactions. Examples of these reactions are discussed in greater detail above.

The compounds described herein can contain one or more chiral centers. Unless otherwise noted, the disclosed structures cover all stereoisomers, conformers, rotamers, isomers, and enantiomers of the represented compounds. Further, polymers or other materials containing the disclosed compounds can include racemic forms of the compounds in addition to individual stereoisomers, as well as mixtures containing any of these. Substituents on the tetrazine flame retardants and/or polymers described herein may participate in additional chemical reactions, transformations, or interactions, which can include synthesis, decomposition, single and/or double replacement, oxidation/reduction, acid/base, nucleophilic, electrophilic and radical substitutions, addition/elimination reactions, and polymerization reactions.

Where isomers of a named alkyl, alkenyl, alkoxy, aryl, or other functional group exist (e.g., n-butyl, iso-butyl, sec-butyl, and tert-butyl), reference to a member of the group without specifying a particular isomer (e.g., butyl) is intended to include all isomers in the family (e.g., n-butyl, iso-butyl, sec-butyl, and tert-butyl). Further, unless specified otherwise, reference to one member of the group (e.g., n-butyl) includes the remaining isomers in the family (e.g., iso-butyl, sec-butyl, and tert-butyl).

Unless otherwise noted, chemical reactions are performed at ambient conditions or under slight heating with no special atmosphere or head space, and may be performed using standard organic solvents to manage mix properties such as viscosity and flow index. Standard procedures for quenching reactions, solvent removal, and purification are performed. Room temperature is between about 15° C. and 25° C. unless otherwise indicated. Ranges (e.g., time, concentration, temperature, etc.) indicated herein include both endpoints and all numbers between the endpoints. Unless specified otherwise, the use of "about" or "approximately" in connection to a range applies to both ends of the range (e.g., "approximately 1 g-5 g" should be interpreted as "approximately 1 g-approximately 5 g"). Unless otherwise indicated, modifying terms such as "about" or "approximately" indicate +/−10% of a recited value, range of values, or endpoints of one or more ranges of values.

The processes discussed herein and their accompanying drawings are not to be construed as limiting. One skilled in the art would recognize that a variety of techniques may be used that vary in conditions, components, methods, etc., which ultimately generate tetrazine flame retardants and flame-retardant polymers containing tetrazine flame retardants. In addition, the conditions can optionally be changed over the course of a process. Further, in some embodiments processes can be added, omitted, or carried out in alternate orders, while still remaining within the scope of the disclosure, as will be understood by a person of ordinary skill in the art. It should also be noted that processes can be carried out by a single entity, or by multiple entities. For example, a first entity may produce the tetrazine flame retardants and a second entity may produce the flame-retardant polymers.

What is claimed is:
1. A flame-retardant compound, comprising:
  a tetrazine moiety; and
  at least one organophosphorus moiety.
2. The flame-retardant compound of claim 1, wherein the flame-retardant compound has the following structure:

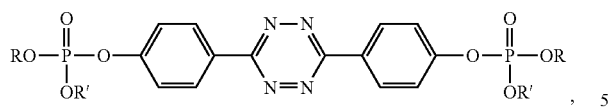
, 5 wherein R is a first substituent and R' is a second substituent.

3. The flame-retardant compound of claim 2, wherein at least one of the R and the R' includes a reactive functional group.

4. The flame-retardant compound of claim 2, wherein the R and the R' are alkyl substituents.

5. The flame-retardant compound of claim 1, wherein at least one of the organophosphorus moiety is a substituent derived from 9,10-dihydro-9-oxa-10-phosphaphenanthrene-10-oxide (DOPO).

6. An article of manufacture, comprising:
a polymer; and
a flame-retardant compound, comprising:
a tetrazine moiety; and
at least one organophosphorus moiety.

7. The article of manufacture of claim 6, further comprising an electronic component.

8. The article of manufacture of claim 6, wherein the polymer is a synthetic rubber.

9. The article of manufacture of claim 6, wherein the polymer is a polybutadiene.

10. The article of manufacture of claim 6, wherein the flame-retardant compound is bound to the polymer.

\* \* \* \* \*